United States Patent [19]
Christman, Jr.

[11] Patent Number: 5,190,171
[45] Date of Patent: Mar. 2, 1993

[54] MULTI-TIERED COLLAPSIBLE TRANSPORTER AND STORAGE RACK

[76] Inventor: George W. Christman, Jr., 8 Highland Ave., Sea Cliff, N.Y. 11579

[21] Appl. No.: 726,743

[22] Filed: Jul. 8, 1991

[51] Int. Cl.⁵ ............................................. A47F 5/00
[52] U.S. Cl. .................................... 211/188; 211/186
[58] Field of Search ............... 211/187, 186, 189, 194, 211/188, 133, 126; 280/79.3, 47.35, 47.19

[56] References Cited

U.S. PATENT DOCUMENTS

| | | | |
|---|---|---|---|
| 1,991,397 | 2/1935 | Lampman | 280/79.3 X |
| 2,654,487 | 10/1953 | Degener | 211/188 |
| 2,918,176 | 12/1959 | Bell et al. | 211/187 X |
| 3,411,634 | 11/1968 | Pesce | 211/186 X |
| 3,788,242 | 1/1974 | Hassel et al. | 211/187 X |
| 4,703,702 | 11/1987 | Speicher | 211/188 X |
| 4,757,769 | 7/1988 | Suttles | 211/188 X |
| 4,967,916 | 11/1990 | Handler et al. | 211/187 |
| 5,016,765 | 5/1991 | Leonardo | 211/194 X |
| 5,040,469 | 8/1991 | Schafer | 211/187 X |

Primary Examiner—Robert W. Gibson, Jr.
Attorney, Agent or Firm—Steven T. Zelson and Elias T. Lambiris

[57] ABSTRACT

A multi-tiered collapsible storage and transporter rack for banker boxes, or other products, which is formed of two or more rectangular horizontal shelves, each shelf having four vertical tubular sockets at the respective corners thereof; and which includes vertical frames at the respective ends thereof formed of vertical elongated tubular members and horizontal tie members welded thereto. The tubular members of the vertical frames are removably received in the vertical sockets attached to the shelves. Casters may be removably mounted in the lower end of the tubular sockets of the lower shelf. Diagonal braces at one or both sides may also be provided.

3 Claims, 1 Drawing Sheet

MULTI-TIERED COLLAPSIBLE TRANSPORTER AND STORAGE RACK

BACKGROUND OF THE INVENTION

A multi-tiered collapsible transporter and storage rack is provided which is particularly, although not exclusively, intended for the transportation of banker type boxes from an office to a warehouse, and for storing the boxes at the warehouse. This eliminates the need to unload the boxes at the warehouse, or to reload the boxes should they be subsequently required.

The rack to be described consists of vertical welded tubular frames, formed, for example, of cold rolled steel. The frames extend between horizontal shelves and form sockets to receive vertical tubular members mounted on the shelves. This construction enables the rack to be assembled and disassembled without the need for tools or fasteners.

The shelves may be available in various lengths and widths. The shelves are preferably constructed to have angle iron sides and ends, and to have the vertical tubular members mounted at the respective corners thereof. Flat rigid strips are welded to the sides and ends of each shelf, and the strips extend from end to end, and from side to side, in co-planar relationship to form a bottom for each shelf. The tubular members and strips may be formed of cold rolled steel.

Each shelf may be mounted with its angle iron sides and ends extending upwardly to form a flange to hold the boxes or other products in place. Alternatively the shelves may be reversed for easy slide on and off of the boxes or other products.

Casters may be mounted in the lower ends of the tubular members of the lower shelf to make the rack mobile. Alternatively, the racks may be provided without casters to remain stationary, or to be moved by a fork truck. All shelf positions are interchangeable.

SUMMARY OF THE INVENTION

A multi-tiered collapsible transporter and storage rack for banker boxes or other products is provided. The rack is formed of two or more rectangular horizontal shelves, each having four vertical tubular members at the respective corners thereof; and vertical frames at the respective ends formed of vertical elongated tubular members, and horizontal tie members welded to the tubular members. The tubular members of the vertical frames form sockets which removably receive the vertical sockets at the corners of the shelves. Casters may be removably mounted in the lower end of the tubular sockets of the lower shelf. Diagonal braces may be provided at one or both sides, if so desired.

DETAILED DESCRIPTION OF THE ILLUSTRATED EMBODIMENT

Figure 1:
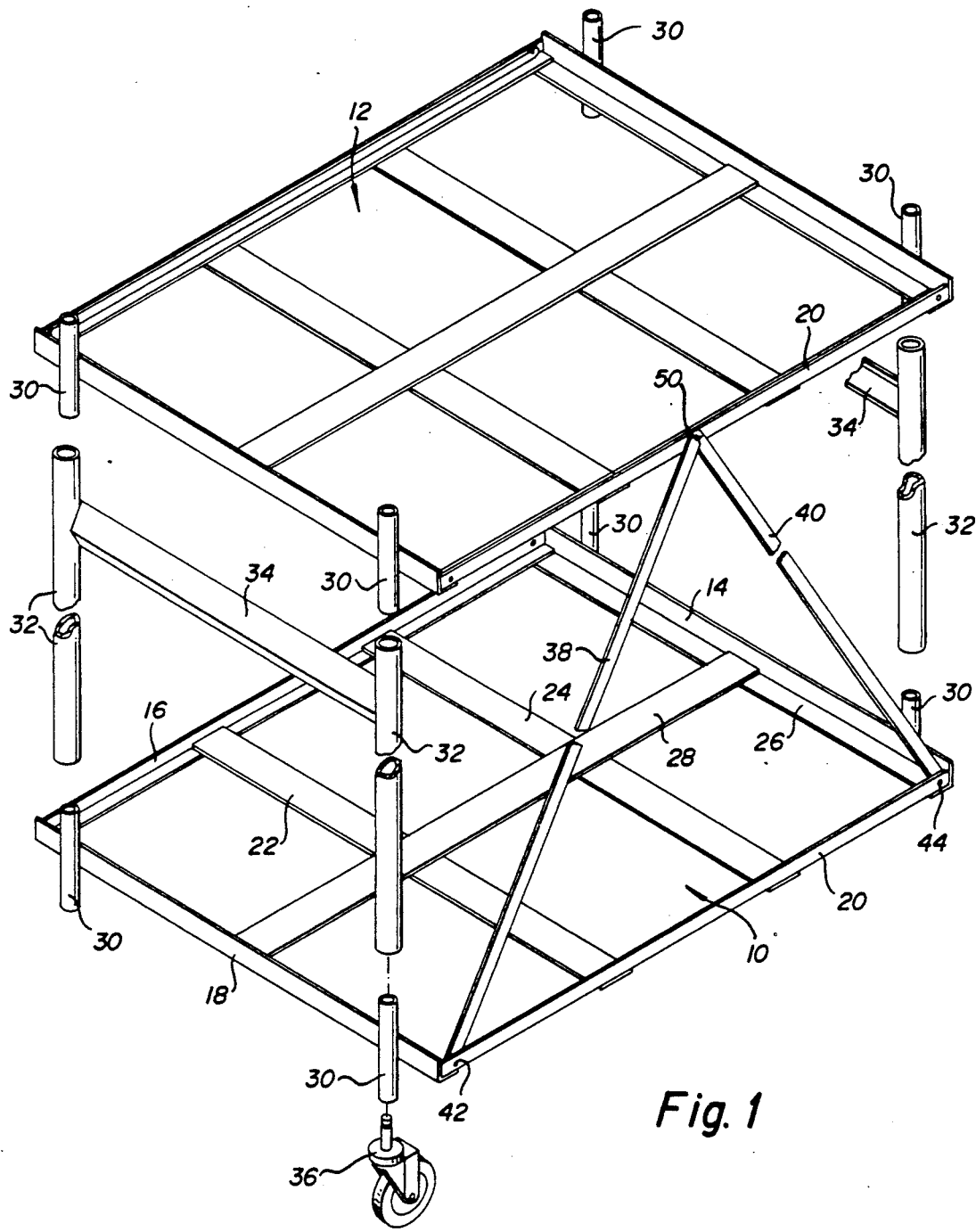
FIG. 1 is a detached perspective view of one embodiment of the invention.

The transporter and storage rack shown in FIG. 1, comprises a lower shelf 10 and an identical upper shelf 12. Each shelf is formed of strips of angle iron 14, 16, 18 and 20. The angle-iron strips 14 and 18 extend along the opposite ends of the shelf, and the angel-iron strips 16 and 20 extend along the opposite sides.

Each shelf also has a number of rigid straps, such as the straps 22, 24 and 26, which extend across the shelf in spaced and parallel relationship with one another, and which are welded or otherwise attached to the angle-iron strips 16 and 20. Each shelf also includes an additional strap, such as strap 28, which extends from one end of the shelf to the other, and which is welded, or otherwise attached, to the angle-iron strips 14 and 18 at the ends of the shelf.

Each shelf also has four tubular tubular members 30 vertically mounted at the respective corners of the shelf. The vertical tubular members 30 are received in respective sockets formed by vertical tubular members 32 of a pair of vertical end frames, the tubular members 32 being attached to transverse horizontal v-shaped tie members 34, the tie members 34 being welded, or otherwise being attached to the tubular members. The vertical tubular members 30, of the upper shelf 12 are received in the sockets formed by the upper ends of the tubular members 32, so that a multi-tier transporter and storage rack may be provided which is collapsible, and which may be assembled and disassembled without the need for tools.

Casters, such as caster 36 may be received in the lower ends of the tubular members 30 of the lower shelf to make the rack mobile.

The rack may also be provided with a pair of diagonal strips 38 and 40. The lower ends of strips 38 and 40 are pivotally mounted to the angle-iron strip 20 by appropriate pivot pins 42 and 44. The strips 38 and 40 may be turned down into the plane of the lower shelf, or they may be extended diagonally, as shown in FIG. 1, and releasably coupled to a pin 50 at an intermediate point on the angle iron side strip 20 of the upper shelf 12. Pin 50 is received in notches formed in the ends of strips 38 and 40. The strips 30 and 40 may be easily released from the pin 40, merely by turning them in opposite directions about their pivot pins 42 and 44.

The invention provides, therefore, a simple transporter and storage rack which is particularly adapted for the transportation and storage of banker boxes. The rack is convenient, in that it may be easily disassembled and stored in a flat condition, and it may easily be assembled into the configuration shown in FIG. 1, without the need of tools. Additional shelves may be mounted on the rack if so desired.

It will be appreciated that while a particular embodiment of the invention has been shown and described, modifications may be made. It is intended in the claims to cover all modifications which come within the true spirit and scope of the invention.

I claim:

1. A transporter and storage rack comprising: At least two rectangular tiered horizontal shelves mounted in spaced parallel relationship one over the other; four vertical tubular members mounted at the respective corners of each shelf; four elongated vertical tubular members forming sockets for removable receiving the upper ends of respective ones of said vertical tubular members of the lowermost shelf and extending upwardly from the plane of the lowermost shelf to receive the lower ends of respective ones of said vertical tubular members of the uppermost shelf, each of said shelves being formed of strips of angle-iron extending around the periphery thereof, and longitudinal and transverse rigid straps attached to said angle-iron strips and extending therebetween in co-planar relationship, and which includes two diagonal rigid strips having their lower ends pivotally mounted the ends of the strip of the angle-iron extending along one side of the lower shelf, said diagonal strips extending upwardly to the strip of angle-iron extending along the corresponding side of the upper shelf, and fastener means mounted on the last-named strip of angle-iron for releasably securing the upper ends of the diagonal strips thereto.

2. The transporter and storage rack defined in claim 1, and which includes transverse tie members attached to respective pairs of said tubular member at the respective ends of the rack and extending therebetween to form vertical frames at the respective ends of the rack.

3. The transporter and storage rack defined in claim 1, and which includes four casters received in the lower ends of respective ones of said vertical tubular members of the lowermost shelf.

* * * * *